Figure 1:
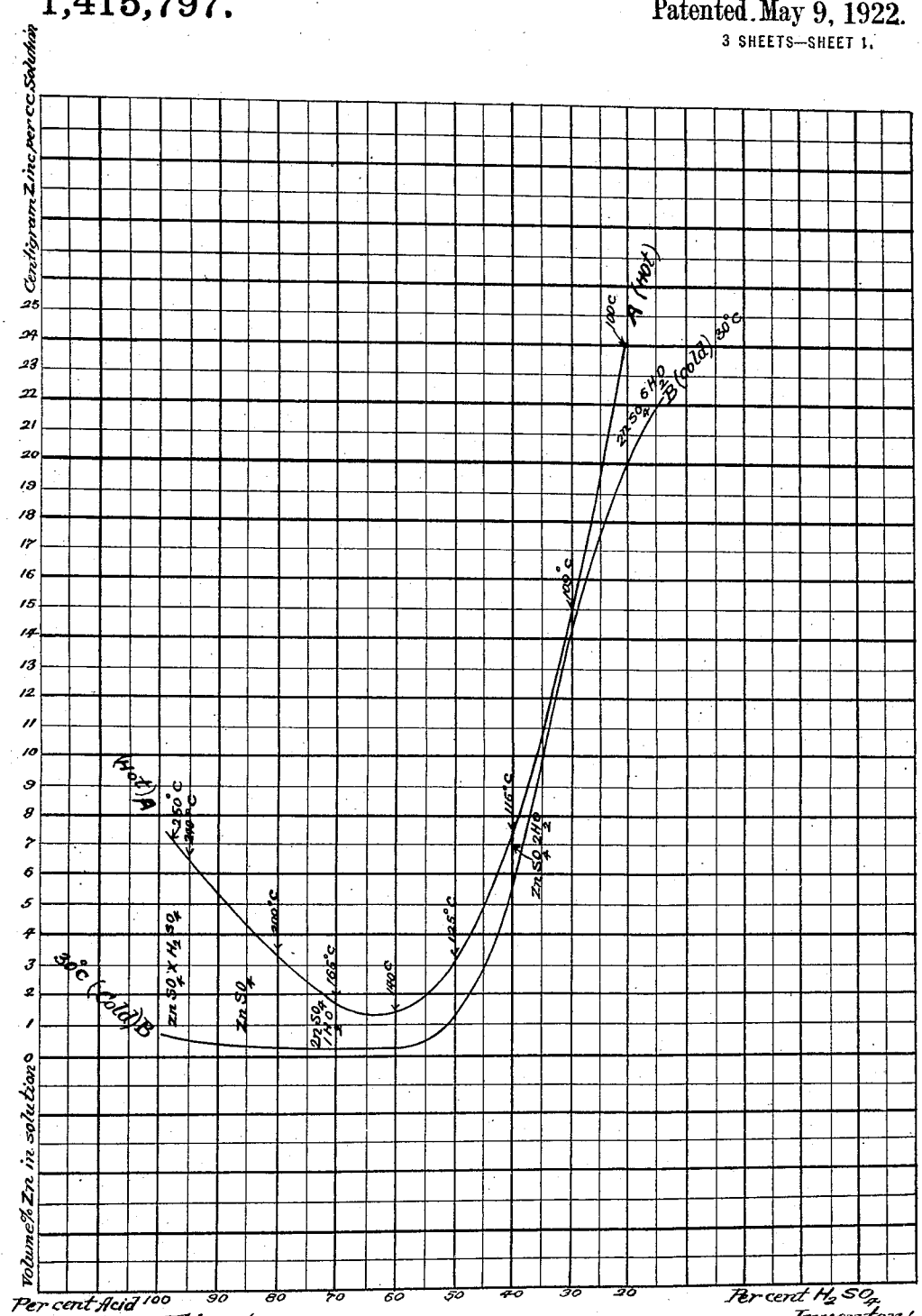
Figure 2:
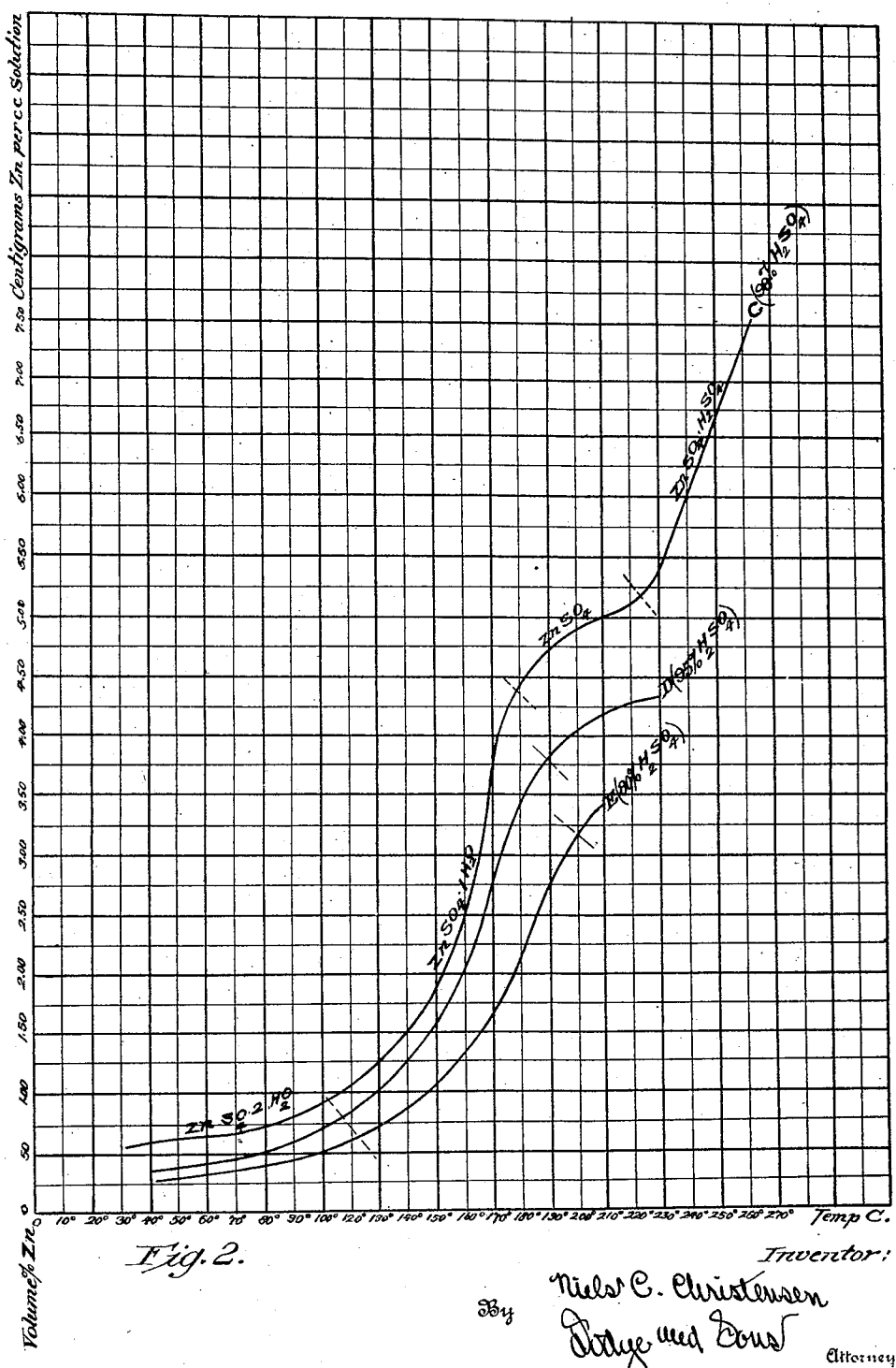

N. C. CHRISTENSEN.
PROCESS OF TREATING ZINC ORES AND ZINC PRODUCTS.
APPLICATION FILED FEB. 21, 1920.

1,415,797.                                    Patented May 9, 1922.
3 SHEETS—SHEET 1.

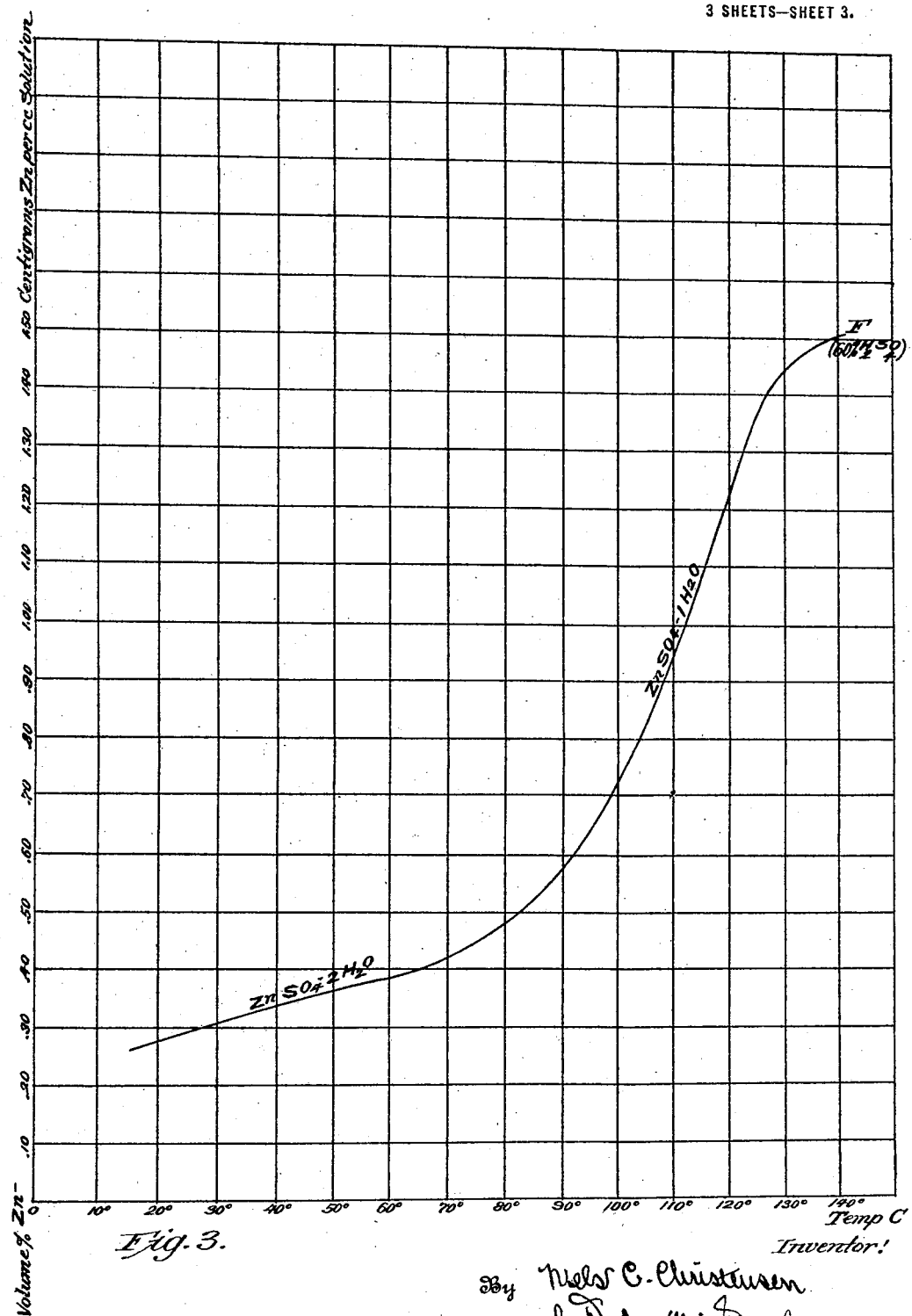

UNITED STATES PATENT OFFICE.

NIELS C. CHRISTENSEN, OF SALT LAKE CITY, UTAH.

PROCESS OF TREATING ZINC ORES AND ZINC PRODUCTS.

1,415,797.  Specification of Letters Patent.  Patented May 9, 1922.

Application filed February 21, 1920. Serial No. 360,484.

*To all whom it may concern:*

Be it known that I, NIELS C. CHRISTENSEN, a citizen of the United States, residing at Salt Lake City, in the county of Salt Lake and State of Utah, have invented certain new and useful Improvements in Processes of Treating Zinc Ores and Zinc Products, of which the following is a specification.

This invention relates to the separation of zinc from zinc ores and zinc products and zinc solutions, and the manufacture of zinc sulphate or anhydrous zinc sulphate therefrom. The process is particularly adapted to the separation of the zinc from mixtures with lead compounds in ores or metallurgical products and relates particularly to the precipitation of the zinc from sulphuric acid solutions of zinc made by the treatment of ores, or other products containing zinc, with sulphuric acid solutions.

Various applications of my process in the treatment of the sulphide ores of zinc are described in my patent applications Nos. 327,402, 330,035. The general application of my process to oxidized zinc ores and zinc products of various kinds are described in the following.

My process in general is based upon the discoveries which I have made with regard to the solubility of zinc as a sulphate in solutions of sulphuric acid of different concentrations described and figured in my patent application No. 327402.

The main facts are readily gathered from the accompanying curves drawn from data secured in my tests upon various zinc ores and products. Fig. I is composed of two curves A and B. A shows the solubility of zinc sulphate in hot (practically at the boiling point) acids and B in cold (30° C.) acids of different strengths from 20% 98% $H_2SO_4$. The curves are plotted between the co-ordinates percentage strength of acid (i. e. per centage of $H_2SO_4$ in the acid) and the "volume per cent" zinc in the acid (i. e. the per cent zinc in solution figuring the density of the acid as one, or in other words, the centigrams of zinc in solution in one cubic centimeter of acid). The volume per cent is used instead of the actual per cent by weight because the former would be used in practically all calculations.

Fig. II is composed of three curves C, D and E, showing the solubility of the zinc sulphate at different temperatures in 98% $H_2SO_4$, 95% $H_2SO_4$, and 80% $H_2SO_4$ respectively.

Fig. III consists of one curve F showing the solubility of zinc sulphate at different temperatures in 60% $H_2SO_4$. Curves C, D, E and F are all plotted between the co-ordinates temperature in degrees centigrade and volume per cent zinc in solution. On curve A the approximate boiling temperatures of the acids of different concentrations are noted and the nature of the main zinc salt precipitated upon cooling the saturated acids of different strengths is noted between the curves A and B.

As will be noted from these curves the cold acids of a concentration above 55% $H_2SO_4$, will carry but a very small amount of $ZnSO_4$ in solution, whereas below 50% the solubility of the zinc sulphate in the cold acid increases very rapidly as the percentage of $H_2SO_4$ in the acid solution decreases. This fact makes possible the almost complete precipitation of the zinc sulphate from sulphuric acid by concentrating the acid solutions to 60% $H_2SO_4$. For example a cold solution containing 25% $H_2SO_4$ will hold approximately 17% Zn as zinc sulphate. A cold solution containing 60% $H_2SO_4$ will hold approximately 3% Zn as sulphate. Therefore if a 25% sulphuric acid carrying 17% Zn as sulphate is concentrated to 60% acid, over 98% of the zinc will be precipitated out as zinc sulphate, which precipitate may then be separated from most of the acid by settling and decantation or by filtration.

As will also be noted from the curves A and B the hot acids of concentrations above 50% hold a much larger amount of zinc sulphate in solution than the cold acids of equal concentration. For example the cold acids above 55% $H_2SO_4$ all hold approximately three tenths (or less) per cent of zinc in solution as zinc sulphate, whereas the hot acids will hold from one and one-half per cent zinc as sulphate in 60% acid to eight per cent in 98% acid. Therefore if the hot acids above a concentration of 50% $H_2SO_4$ are saturated with zinc sulphate (or carry a considerable proportion of the maximum amount of zinc sulphate soluble in the acid) a large part of the zinc sulphate may be precipitated from the acids by cooling and then separated from the acid by settling and decantation or by filtration.

The zinc sulphate precipitated from the relatively concentrated sulphuric acid and separated from the excess acid by decantation or filtration will of course carry some entrained $H_2SO_4$ (similar to moisture in any filter cake or settled material) which is preferably removed from the zinc sulphate by heating, in a low temperature kiln or dryer, to such a temperature as to drive off all this residual $H_2SO_4$ as $H_2O$ and $SO_3$ and leave the zinc salt as anhydrous zinc sulphate.

This anhydrous zinc sulphate may be utilized for a large variety of purposes. It may be dissolved in water and used for all the purposes for which zinc sulphate is used. It may be converted to $ZnSO_4$ $7H_2O$ by the addition of water. It may be roasted to give a high grade zinc oxide, which may be treated in Wetheril grates to secure a high grade zinc oxide pigment or in retorts to secure a high grade spelter. It may be utilized to make zinc chloride by the wet method, i. e. by adding common salt to the zinc sulphate solution and precipitating out the sodium sulphate. It may be utilized to make anhydrous zinc chloride by heating the mixture of zinc sulphate and calcium chloride (or other chloride) and volatilizing or boiling off the $ZnCl_2$. The anhydrous $ZnCl_2$ thus formed is an ideal product for treatment by electrolysis in the fused condition for the recovery of spelter and chlorine. The zinc sulphate, or particularly the zinc oxide made by roasting the zinc sulphate, is ideal material for the manufacture of pure zinc by the (wet) electrolytic method. These are only a few of the methods of utilizing the zinc sulphate formed by my process.

The applications of my process to the treatment of zinc ores are described in my patent applications Nos. 327402, 330035, 330320.

The applications of my process to oxidized ores and products etc. are briefly described in the following: The process consists in a general way in treating the ores and zinc products with water and sulphuric acid so as to secure a relatively concentrated zinc solution in a relatively more dilute sulphuric acid, is considerably less than 50% $H_2SO_4$ and concentrating this solution preferably to approximately 60% $H_2SO_4$ (or above 60%) and precipitating the zinc sulphate by reason of the increased concentration of the sulphuric acid solution. The acid is preferably cooled after the concentrating operation so that the largest possible amount of zinc sulphate is precipitated, though the cooling is not necessary to secure a very high percentage of precipitation in this case.

The process may also be carried out by dissolving the zinc minerals or products in the hot relatively concentrated sulphuric acid above 50% $H_2SO_4$ and precipitating the zinc sulphate by cooling but this method requires a much larger volume of acid than the first method in which the zinc is brought into solution in a relatively more dilute acid (considerably less than 50% $H_2SO_4$) and then concentrated to 60% $H_2SO_4$ (or above) and then cooled to secure the maximum precipitation. What proportion of concentration (by evaporation or addition of $SO_3$) and what proportion of cooling will be used in the process will depend on the conditions in each case, which will be determined by comparing the cost of handling and heating and cooling a large volume of relatively concentrate acid, with the cost of handling a much smaller volume of acid and plus the cost of concentrating this smaller volume of more dilute acid to approximately 60% $H_2SO_4$. In most cases the latter method will be cheaper in installation and operation.

Having described the process in a general way the application of the process to a few typical cases is described in the following:

The treatment of a mixed lead zinc fume from a reverberatory such as is used in the Florence process, or from the blowing up grate and blast furnace of the Bartlett process, consisting of a mixture of zinc oxide and lead sulphate, for the separation of the zinc and lead, is carried out as follows: The fume is first treated with sulphuric acid to dissolve the zinc oxide and give a concentrated or approximately saturated zinc solution carrying an excess of sulphuric acid so as to give a solution carrying from 20% to 30% acid. The strength of the acid solution may be varied as desired the more dilute the acid, the greater the amount of water which must be evaporated during the concentration and the greater the amount of zinc sulphate held in solution, and vice-versa with the more concentrated acid solution. This acid zinc solution is then separated from the residue, consisting mainly of lead sulphate, by filtration (or decantation) and concentrated by evaporation of the excess water, to an approximately 60% acid solution. Most of the zinc sulphate is precipitated by this concentration but it is preferable to cool the mixture of acid and zinc sulphate at this stage so as to precipitate most of the zinc sulphate in solution in the hot acid. As much as possible of the excess cold acid is then separated from the zinc sulphate by draining or filtration and the zinc sulphate which still carries some $H_2SO_4$ as moisture is heated in a low temperature kiln or dryer to such a temperature that this excess of $H_2SO_4$ is driven off as $SO_3$ and $H_2O$ and the zinc sulphate is left as the white anhydrous salt. By this method a very complete separation of the zinc and lead in these low grade products may be made.

Mixed oxidized zinc lead ores may be treated in a similar manner for the recovery of the zinc as zinc sulphate.

The residual lead sulphate from this acid treatment may readily be separated from the insoluble gangue material by means of hot brine and the lead recovered as a chloride by cooling the brine or as lead sponge by electrolysis of the brine-lead solution using iron anodes.

Sulphide ores which have been treated with hydrochloric acid and the zinc and lead converted to chlorides may be treated in a similar manner. During the process of acid treatment and concentration the HCl will be driven off and zinc and lead sulphates formed and the HCl may be condensed and utilized in the treatment of more ore to convert the lead and zinc to chlorides. The procedure as a whole, with the exception of the removal and condensation of the HCl and chloridizing of the lead and zinc, would be similar to the treatment of any oxidized ore.

Zinc sulphate may be recovered from any relatively dilute sulphuric acid solutions by this method without neutralizing the acid and the zinc may be recovered from hydrochloric or nitric acid solutions as a sulphate by the addition of an excess of sulphuric acid and concentration of this acid solution as described. During the process of concentration the HCl or $HNO_3$ will be driven off and may readily be condensed or absorbed for use in the formation of the zinc chloride or zinc nitrate solutions.

The foregoing illustrations of the application of my process are sufficient to make clear its wide application in the treatment of zinc ores and products of various kinds.

Having described my process what I claim and desire to patent is:

1. The process of treating zinc ores and zinc products to separate the zinc therefrom as zinc sulphate, which consists in dissolving the zinc from said products in sulphuric acid to form a solution of zinc sulphate in a relatively dilute sulphuric acid solution and concentrating said acid solution and precipitating zinc sulphate therefrom by reason of the increased concentration of the $H_2SO_4$ in said solution.

2. The process of treating zinc ores and zinc products to separate the zinc therefrom as zinc sulphate, which consists in dissolving the zinc from said products in sulphuric acid to form a solution of zinc sulphate in a relatively dilute sulphuric acid solution and concentrating said acid solution until the $H_2SO_4$ reaches a concentration of approximately 60% and precipitating zinc sulphate therefrom by reason of the increased concentration of the $H_2SO_4$ in said solution.

3. The process of treating zinc ores and zinc products to separate the zinc therefrom as zinc sulphate, which consists in dissolving the zinc from said products in sulphuric acid to form a solution of zinc sulphate in a relatively dilute sulphuric acid solution and concentrating and cooling said acid solution and precipitating zinc sulphate therefrom by reason of the increased concentration of the $H_2SO_4$ in said solution.

4. The process of treating zinc ores and zinc products to separate the zinc therefrom as zinc sulphate, which consists in dissolving the zinc from said products in sulphuric acid to form a solution of zinc sulphate in a relatively dilute sulphuric acid solution and concentrating said acid solution until the $H_2SO_4$ reaches a concentration of approximately 60% and cooling said solution and precipitating zinc sulphate therefrom by reason of the increased concentration of the $H_2SO_4$ in said solution.

5. The process of treating zinc ores and zinc products to separate the zinc therefrom as anhydrous zinc sulphate, which consists in dissolving the zinc from said products in sulphuric acid to form a solution of zinc sulphate in a relatively dilute sulphuric acid solution and concentrating said acid solution and precipitating zinc sulphate therefrom by reason of the increased concentration of the $H_2SO_4$ in said solution and removing said precipitated zinc sulphate from the excess of acid solution and driving off the residual acid solution carried by the moist precipitate by heating said precipitate and thus forming anhydrous zinc sulphate.

6. The process of treating zinc ores and zinc products to separate the zinc therefrom as anhydrous zinc sulphate, which consists in dissolving the zinc from said products in sulphuric acid to form a solution of zinc sulphate in a relatively dilute sulphuric acid solution and concentrating said acid solution until the $H_2SO_4$ reaches a concentration of approximately 60% and precipitating zinc sulphate therefrom by reason of the increased concentration of the $H_2SO_4$ in said solution and removing said precipitated zinc sulphate from the excess of acid solution and driving off the residual acid solution carried by the moist precipitate by heating said precipitate and thus forming anhydrous zinc sulphate.

7. The process of treating zinc ores and zinc products to separate the zinc therefrom as anhydrous zinc sulphate, which consists in dissolving the zinc from said products in sulphuric acid to form a solution of zinc sulphate in a relatively dilute sulphuric acid solution and concentrating and cooling said acid solution and precipitating zinc sulphate therefrom by reason of the increased concentration of the $H_2SO_4$ in said solution and removing said precipitated zinc sulphate from the excess of acid solution and driving off the residual acid solution carried by the moist precipitate by heating said precipitate and thus forming anhydrous zinc sulphate.

8. The process of treating zinc ores and zinc products to separate the zinc therefrom as anhydrous zinc sulphate, which consists in dissolving the zinc from said products in sulphuric acid to form a solution of zinc sulphate in a relatively dilute sulphuric acid solution and concentrating said acid solution until the $H_2SO_4$ reaches a concentration of approximately 60% and cooling said solution and precipitating zinc sulphate therefrom by reason of the increased concentration of the $H_2SO_4$ in said solution and removing said precipitated zinc sulphate from the excess of acid solution and driving off the residual acid solution carried by the moist precipitate by heating said precipitate and thus forming anhydrous zinc sulphate.

In testimony whereof I have signed my name to this specification.

NIELS C. CHRISTENSEN.